Feb. 3, 1948.  J. E. LODGE  2,435,284
SPLICE FOR CONDUCTORS AND METHODS OF SPLICING CONDUCTORS
Filed Sept. 4, 1943  3 Sheets-Sheet 1
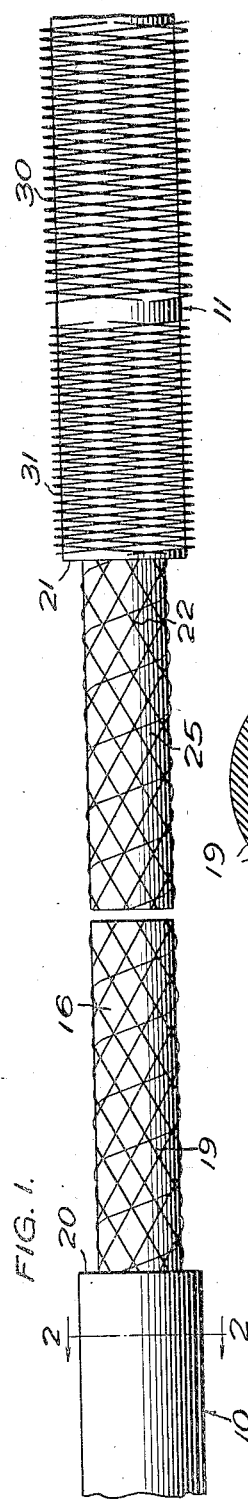
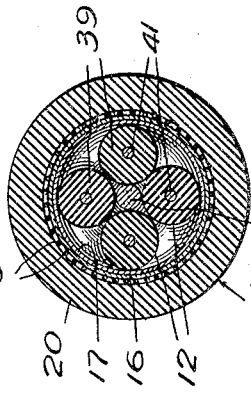
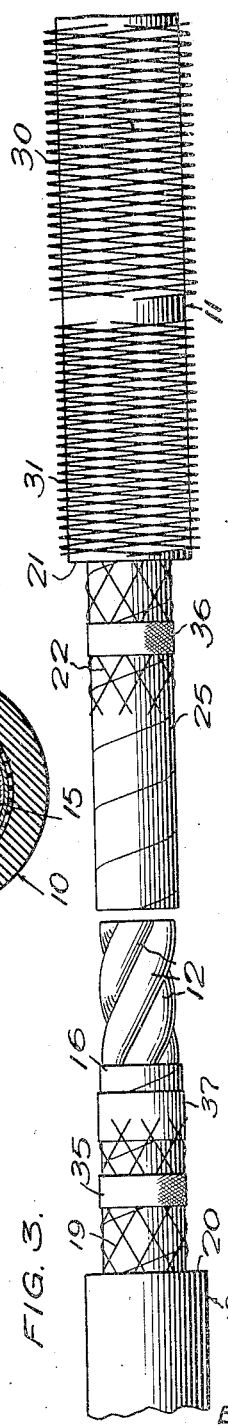
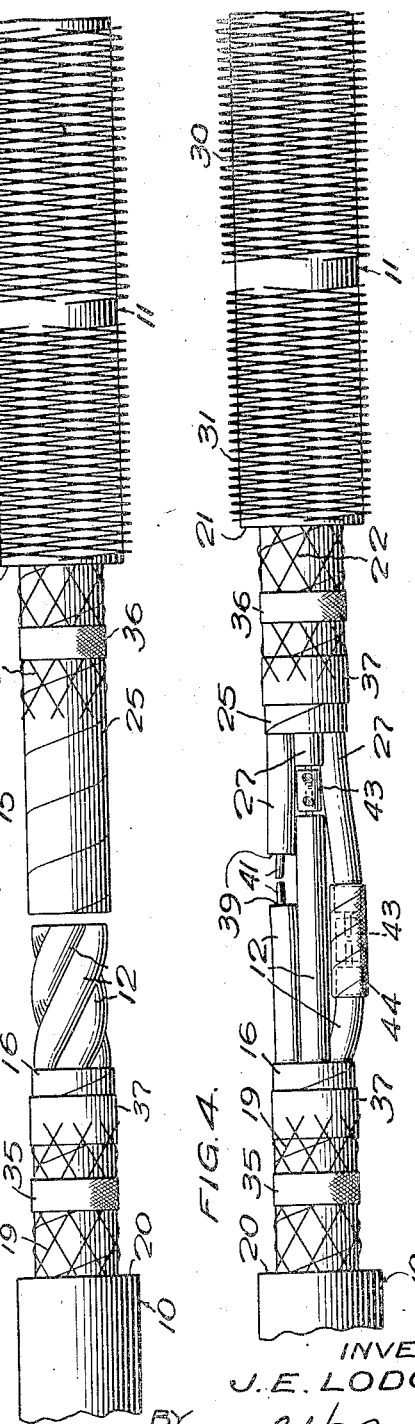
INVENTOR
J. E. LODGE
BY
ATTORNEY Feb. 3, 1948. J. E. LODGE 2,435,284
SPLICE FOR CONDUCTORS AND METHODS OF SPLICING CONDUCTORS
Filed Sept. 4, 1943 3 Sheets-Sheet 2
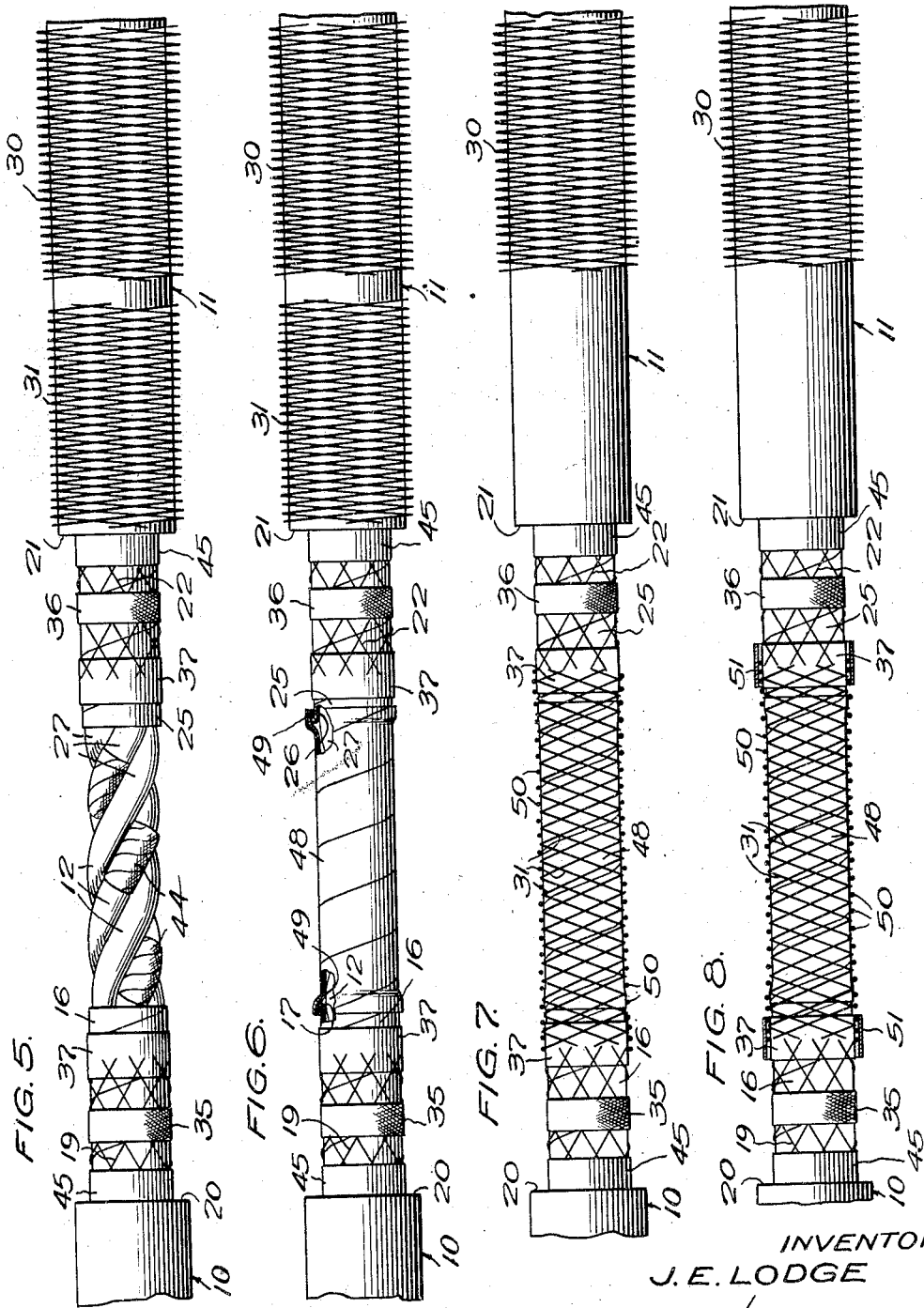
INVENTOR
J. E. LODGE
BY
ATTORNEY Feb. 3, 1948. J. E. LODGE 2,435,284
SPLICE FOR CONDUCTORS AND METHODS OF SPLICING CONDUCTORS
Filed Sept. 4, 1943 3 Sheets-Sheet 3
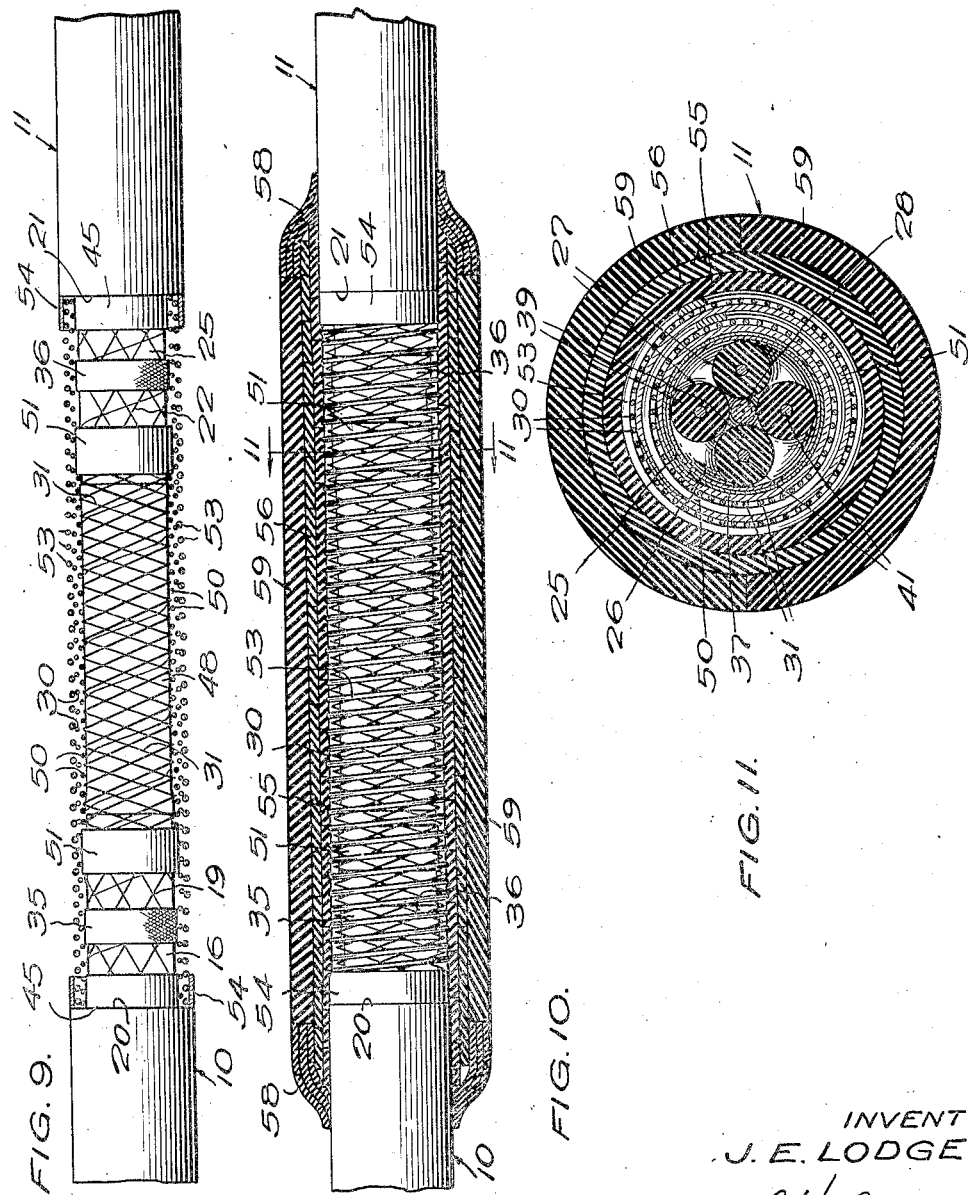
INVENTOR
J. E. LODGE
BY
ATTORNEY Patented Feb. 3, 1948

2,435,284

UNITED STATES PATENT OFFICE 2,435,284

SPLICE FOR CONDUCTORS AND METHOD OF SPLICING CONDUCTORS

Joseph E. Lodge, Baltimore, Md., assignor to Western Electric Company, Incorporated, New York, N. Y., a corporation of New York Application September 4, 1943, Serial No. 501,208

9 Claims. (Cl. 174—84)

This invention relates to splices for conductors and methods of splicing conductors, and has for its object the provision of new and improved splices for conductors and new and improved methods of splicing conductors.

In the manufacture of cables it is sometimes necessary to splice lengths of the cables in order to obtain continuous cables of the total length required. When the cables are provided with metallic shielding and protecting braid, means must be provided in splices of the cable to give sufficient mechanical strength to each splice to make the splice as strong as the rest of the cable.

One embodiment of the invention comprises a splice for cables provided with metal reinforcing braids and the method of splicing such cables in which a braided metal sleeve is positioned over the spliced conductors and bound into position by means of a metal lashing wire to provide a firm support for a subsequently applied braided sleeve which is likewise lashed in position by a lashing wire.

Other objects and advantages of the invention will become apparent from the following detailed description, when read in conjunction with the appended drawings, in which Fig. 1 is a plan view of the ends of two cables to be spliced;

Fig. 2 is an enlarged sectional view of one of the cables taken along the line 2—2 of Fig. 1.

Figs. 3, 4, 5, 6, 7, 8, 9 and 10 are views of successive stages in the production of the splice, the completed splice being shown in partial section in Fig. 10, and Fig. 11 is an enlarged sectional view of the completed splice taken along the line 11—11 of Fig. 10.

Referring now to the drawings, a cable 10 to be spliced to a cable 11 consists of four individually insulated conductors 12—12 wound helically about a filler 15 made of insulating material, such as ethyl cellulose strands. The conductors 12—12 are wrapped with a continuous strip of paper tape 16 having a conducting metal surface 17 formed on the inside thereof, the convolutions of the strip overlapping to form a continuous sheath which serves as an electrical shield for the conductors. A steel wire braid 19 formed tightly around the paper tape 16 gives mechanical strength to the cable and has an insulating rubber jacket 20 formed thereover.

The cable 11 is identical with the cable 10 and has a rubber jacket 21, a steel wire braid 22, and a sheath of paper tape 25 having a metal surface 26 formed on the inside thereof surrounding four individually insulated conductors 27—27 which are wound about a filler 28.

In the splicing operation, an elongated, loosely braided splicing sleeve 30 made of steel wire is slipped over the end of the cable 11 and a shorter, loosely braided, filler sleeve 31, also made of steel wire, is placed on the cable after the first one. Both the braided sleeves are slid back on the cable 11 so that they will not interfere with subsequent operations. Portions of the jacket 20 and 21 are then removed from the cables 10 and 11 and the wire braids 19 and 22 are taped in position by tapes 35 and 36, respectively (Fig. 3), to prevent the sheaths 19 and 22 from expanding. The end portions of the metal braids are severed at a point adjacent to the tapes 35 and 36, and between these tapes and the ends of the cables, the severed portions of the braids are removed from each of the cables 10 and 11. Tinned copper protective tubes 37—37 are then inserted under the ends of the wire braids 19 and 22 so that each tube is half covered by one of the braids and the ends of the braids are secured in place upon the tubes by suitable tapes. Tubes 37—37 prevent projecting ends of the braid from puncturing the shielding tapes 16 and 25 or the insulations of conductors 12—12 and 27—27. The tapes 16 and 25 are then removed from the ends of the conductors 12—12 and 27—27 to a point almost but not quite up to the tubes 37—37 (Figs. 3 and 4). The ends of the insulated conductors 12—12 and 27—27 are next untwisted from the fillers 15 and 28, respectively, and the fillers are cut off approximately at the points where the tapes 16 and 25 have been severed (Fig. 4).

The cables 10 and 11 are then placed in suitable clamps (not shown) which clamps hold them in positions suitable for splicing. One of the conductors 12—12 and the corresponding one of the conductors 27—27 are severed at points so that the ends thereof just touch when they are drawn towards each other (Fig. 4). Short lengths of insulations 39—39 are removed to bare the ends of conductors 41—41. This operation is repeated with each of the insulated conductors 12—12 and the corresponding insulated conductors 27—27, but each pair is severed and freed of insulation at a different point along the cables so that the resultant joints will be staggered.

Metal tubes, such as tubes 43—43 (Fig. 4), are slipped over the conductors 41—41 and are crimped thereon and soldered thereto to electrically join each pair of the conductors 12—12 and 27—27. The joints thus formed are then individually wrapped with tapes 44—44 made of insulating material, such as a rubber compound, to completely insulate the joints.

One of the cables 10 and 11 is then unclamped and twisted (Fig. 5) to return the spliced conductors 12—12 and 27—27 to the positions they occupied before they were untwisted. The unclamped cable is then reclamped with the conductors 12—12 and 27—27 properly twisted. Tubes 45—45 are formed by wrapping strips of copper upon the braids 19 and 22 adjacent to the ends of jackets 20 and 21 (Fig. 5).

The ends of the paper tapes 16 and 25 are bent back and a similar paper tape 48, having a metal surface 49 formed on the inside thereof, is wrapped around the bared portions of the spliced conductors 12—12 and 27—27 in between the ends of the tapes 16 and 25. The tape 48 is wrapped with the metal surface 49 inwardly so that the surface 49 contacts the metal surfaces 17 and 26 on the tapes 16 and 25, respectively, to electrically join the surfaces 17 and 26 and thereby to form a continuous electrical shield.

The braided filler sleeve 31 then is drawn over the spliced portions of the conductors, (Fig. 7), stretched out, and starting with one of the tubes 37—37 is tightly lashed with a lashing wire 50 to that tube, to the tape 48 and to the other of the tubes 37—37. Thus, the ends of the braids are tightly bound around the conductors. Projecting ends of the wires of sheaths 19 and 22, lashing wire 50, and of the sleeve 31 are severed and taped down with tapes 51—51 (Fig. 8).

The braided splicing sleeve 30 is then pulled over the splice, stretched out, and one end thereof is lashed to one of the tubes 45—45 by a lashing wire 53, and the lashing is continued from that tube until the other end of the sleeve 30 has been lashed to the other of the tubes 45—45 (Fig. 9), after which the projecting ends of the sleeve and lashing wire are severed and the ends of any projecting wires are cut off and taped down with tapes 54—54. The tubes 45—45 prevent the severed wire ends from damaging any portion of the cables therebeneath. Thus, the splicing sleeve 30 will be tightly lashed to wire braids 19 and 22 and the filler sleeve 31, and will form a junction therebetween capable of bearing as great a strain as the braids 19 and 22 themselves.

A serving 55 of vulcanizable waterproofing and insulating material, such as rubber tape, is butt wrapped tightly around the jacket 20 (Figs. 10 and 11) of the cable 10 and this wrapping is continued to enclose the sleeve 30 and is terminated after several turns have been wrapped around the jacket 21 of the cable 11. A second serving 56, similar to the serving 55, is butt wrapped over the serving 55 in overlapping relationship thereto and the ends thereof are taped to the jackets 20 and 21 with vulcanizable tapes 58—58. Two strips 59—59 of a vulcanizable material, such as a rubber compound, are laid upon opposite sides of the cables so as to enclose the serving 56.

The splice is then placed in a vulcanizing mold and vulcanized, whereby the vulcanizable materials are vulcanized and the edges of the strips 59—59 joined. After the splice is withdrawn from the mold, any flash formed thereon is buffed off.

The resultant splice is of as great mechanical strength as any other portion of the cables spliced. The electrical insulation and shielding of the splice are also of the same high quality as the remaining portions of the spliced cables, as is the waterproofing quality of the splice. The splice, while of high strength, is short in length and relatively easy to make rapidly.

What is claimed is:

1. The method of splicing cables which include strain-bearing braided metal reinforcing sheaths tightly enclosing conductors, which comprises removing portions of the braided metal reinforcing sheaths from conductors of two such cables to be spliced, sliding a loose strain-bearing braided metal sleeve over the ends of one of the cables, splicing a conductor of one of the cables to a conductor of the other cable, sliding the sleeve over the sliced portion of the conductors to a position overlapping the ends of the sheaths, and tightly lashing the sleeve from one end thereof to the other to secure the sleeve tightly upon the sheaths and the conductors extending therebetween and to take all slack out of the braided sleeve.

2. The method of splicing cables which include strain-bearing braided metal sheaths tightly enclosing conductors thereof, which comprises removing end portions of braided metal sheaths from conductors of such cables to be joined, sliding a braided wire strain-bearing sleeve over the end of one of the cables, splicing the conductors of the cables, sliding the sleeve over the spliced portions of the conductors, and winding a lashing element around the sleeve starting with one end thereof and continuing through the central portion of the sleeve to the other end thereof to simultaneously take the slack out of the sleeve and to secure the sleeve to the sheaths.

3. The method of splicing cables which include strain-bearing braided metal sheaths tightly enclosing conductors thereof, which comprises removing end portions of braided metal sheaths from conductors of such cables to be spliced, placing a strain-bearing braided metal sleeve over the end of one of the cables, splicing the ends of the conductors, insulating said spliced ends, positioning the sleeve over the spliced portions of the conductors so that it overlaps the sheaths, and tightly lashing the sleeve throughout its length to the sheaths and to the conductors, beginning said lashing with one of said sheaths and terminating it upon the other sheath so that all slack is removed from the sleeve.

4. The method of splicing cables which include strain-bearing braided metal sheaths enclosing conductors thereof, which comprises placing a strain-bearing braided metal sleeve over the end of a cable to be spliced to a second cable, severing and removing portions of braided metal sheaths from conductors of the cables, splicing the conductors of the two cables together, insulating the splice thus formed, placing the sleeve in a position overlapping the ends of the sheaths, and winding a lashing wire tightly around the sleeve beginning with one end of the sleeve and continuing to the other end thereof to take the slack out of the sleeve and to secure it tightly upon the sheaths and upon the conductors extending therebetween.

5. The method of splicing cables which include strain-bearing braided metal sheaths enclosing conductors thereof, which comprises severing and removing end portions of braided metal sheaths from conductors of cables to be spliced, sliding a strain-bearing braided metal sleeve over the end of one of the cables, splicing the ends of the conductors, insulating the splice thus formed, placing metal bands under the severed ends of the sheaths, placing metal bands over the sheaths a short distance from the ends thereof, placing the sleeve over the last mentioned metal bands, and tightly winding a wire upon the sleeve from one end to the other to secure it tightly to the last mentioned bands and to the sheaths.

6. The method of splicing cables which include strain-bearing braided metal sheaths surrounding conductors which are enclosed by continuous metal-backed paper tapes having the metal portions thereof on the interiors thereof, which comprises sliding a splicing sleeve and a strain-bearing filler sleeve both of braided metal upon the end of one of a pair of cables to be spliced, removing the end portions of braided metal sheaths from metal-backed paper enclosing therein conductors of the cables, removing the end portions of the metal-backed paper lesser distances than the removal of the sheaths from the ends of the cables, splicing the conductors of the cables, insulating the splice thus formed, inserting metal bands partially under the ends of the sheaths, bending back the ends of the tapes, wrapping the spliced portions of the conductors with a metal-backed tape so that the bent-back ends of the first mentioned metal-backed tapes are electrically connected by the third metal-backed tape, lashing the ends of the filler sleeve to the metal bands and upon the conductors extending therebetween, placing second metal bands upon the sheaths a few inches from the ends thereof, and lashing the splicing sleeve to one of the second metal bands and thence to the sheaths and the filler sleeve and to the other of the second metal bands.

7. A splice for cables, which comprises a pair of cables, each of which has a strain-bearing sheath and at least one insulated conductor enclosed in the strain-bearing sheath, means for electrically connecting the conductor, a strain-bearing braided sleeve positioned over the electrically connected portions of the conductors and extending over the ends of the strain-bearing sheaths, and a continuous lashing wire wound tightly around the entire length of the sleeve starting at one end thereof and ending at the other end thereof for fastening the strain-bearing braided sleeve mechanically to the ends of the strain-bearing sheaths and for taking all of the slack out of the braided sleeve so that any tensile strain applied to the spliced portion of the cable is borne by the sleeve.

8. A splice for cables, which comprises a pair of cables, each of which has a strain-bearing sheath and at least one insulated conductor enclosed in the strain-bearing sheath, means for electrically connecting the conductors, a filler sleeve bound tightly over the connected portions of the conductors, a strain-bearing braided sleeve positioned over the filler sleeve and extending over the ends of the strain-bearing sheaths, and a lashing wire wound tightly around the strain-bearing sleeve from one end thereof to the other for fastening the strain-bearing sleeve mechanically to the ends of the strain-bearing sheaths and for taking all of the slack out of the strain-bearing braided sleeve so that any tensile strain applied to the spliced portions of the cable is borne by that sleeve.

9. A splice for cables, which comprises a pair of cables, each of which has a strain-bearing sheath, a conductive shield enclosed in the sheath and at least one insulated conductor enclosed in the strain-bearing sheath and the shield, means enclosing the connected portions of the conductors for electrically connecting the shields of the two cables and for shielding the connected portions of the conductors, filler means for tightly enclosing the shielding means, a strain-bearing braided sleeve positioned over the filler means and extending over the ends of the strain-bearing sheaths, and a lashing wire wound closely and tightly around the sleeve from one end thereof to the other to fastening the strain-bearing braided sleeve mechanically to the ends of the strain-bearing sheaths and for taking all of the slack out of the braided sleeve so that any tensile strain applied to the spliced portion of the cable is borne by the sleeve.

JOSEPH E. LODGE.

REFERENCES CITED

The following references are of record in the file of this patent:

UNITED STATES PATENTS

| Number | Name | Date |
| --- | --- | --- |
| 2,181,860 | Adkinson | Dec. 5, 1939 |
| 2,287,163 | Bishop | June 23, 1942 |
| 2,008,756 | Green | July 23, 1935 |
| 1,443,613 | Beaver et al. | Jan. 30, 1923 |
| 319,326 | Sawyer | June 2, 1885 |
| 686,832 | Peachey | Nov. 19, 1901 |
| 2,129,540 | Van Billiard | Sept. 6, 1938 |

FOREIGN PATENTS

| Number | Country | Date |
| --- | --- | --- |
| 105,742 | Austria | Feb. 25, 1927 |
| 410,213 | Great Britain | May 17, 1934 |

Certificate of Correction

Patent No. 2,435,284. February 3, 1948.

JOSEPH E. LODGE

It is hereby certified that errors appear in the printed specification of the above numbered patent requiring correction as follows:

Column 2, line 10, for the syllable and hyphen "jack-" read *jackets*; column 5, lines 15 and 16, claim 6, strike out "strain-bearing" and insert the same in line 15, before the word "splicing";

and that the said Letters Patent should be read with these corrections therein that the same may conform to the record of the case in the Patent Office.

Signed and sealed this 21st day of December, A. D. 1948.

[SEAL]

THOMAS F. MURPHY,
*Assistant Commissioner of Patents.*